(12) United States Patent
Leibl (10) Patent No.: US 11,296,607 B2
(45) Date of Patent: Apr. 5, 2022

(54) DC-DC CONVERTER

(71) Applicant: BRUSA Elektronik AG, Sennwald (CH)

(72) Inventor: Michael Leibl, Altstätten (CH)

(73) Assignee: BRUSA HyPower AG, Sennwald (CH)

( * ) Notice: Subject to any disclaimer, the term of this patent is extended or adjusted under 35 U.S.C. 154(b) by 0 days.

(21) Appl. No.: 16/792,844

(22) Filed: Feb. 17, 2020

(65) Prior Publication Data

US 2020/0266713 A1 Aug. 20, 2020

(30) Foreign Application Priority Data

Feb. 19, 2019 (EP) ..................................... 19158114

(51) Int. Cl.
*H02M 3/335* (2006.01)
*H02M 1/00* (2006.01)

(52) U.S. Cl.
CPC ..... *H02M 3/33569* (2013.01); *H02M 1/0043* (2021.05); *H02M 1/0058* (2021.05)

(58) Field of Classification Search
CPC .. H02M 3/335; H02M 3/33569; H02M 1/083; H02M 3/07; H02M 1/0043; H02M 1/0067; H02M 1/0083; H02M 3/01; H02M 3/33571
See application file for complete search history.

(56) References Cited

U.S. PATENT DOCUMENTS

| | | | | |
|---|---|---|---|---|
| 9,356,523 | B2 * | 5/2016 | Yoshida | .................. H02M 3/28 |
| 2012/0262953 | A1 | 10/2012 | Jungreis et al. | |
| 2015/0092451 | A1 * | 4/2015 | Popovici | ........... H02M 3/33569 363/17 |
| 2018/0309375 | A1 | 10/2018 | Luccato et al. | |
| 2019/0044447 | A1 | 2/2019 | Wang et al. | |

OTHER PUBLICATIONS

Wu Hongfei et al: Interleaved LLC Resonant Converter with Hybrid Rectifier and Variable-Frequency Plus Phase-Shift Control for Wide Output Voltage Range Applications, IEEE Transactions on Power Electronics, Institute of Electrical and Electronics Engineers, USA, vol. 32, No. 6, Jun. 1, 2017, pp. 4246-4257.

Johnson Philip Mike et al:"A dual-DSP controlled Sic MOSFET based 96%-efficiency 20kW EV on-board battery charger using LLC resonance technology", 2017 IEEE Symposium Series on Computational Intelligence (SSCI), IEEE, Nov. 27, 2017, p. 1-5.

European Search Report on Application No. EP 19158114 dated Sep. 9, 2019.

* cited by examiner

*Primary Examiner* — Gary L Laxton
(74) *Attorney, Agent, or Firm* — Oppedahl Patent Law Firm LLC (57) ABSTRACT

A DC-DC converter comprises at least a first and a second inductive element. Each inductive element comprises a transformer (312, 322), input terminals (314, 324, 315, 325) and output terminals (316, 326, 317, 327). A switching circuit (2) is arranged to supply a first alternating voltage to input terminals (314, 315) of the first inductive element, and a second alternating voltage to input terminals of the second inductive element (31, 32). A rectification circuit (4) is arranged to rectify a first and a second output voltage arising at output terminals (316, 317) of the first and second inductive elements (31, 32), respectively. One of the output terminals of the first inductive element (31) is capacitively coupled to one of the output terminals of the second inductive element (32).

17 Claims, 5 Drawing Sheets

DC-DC CONVERTER

BACKGROUND

The invention relates to the field of electronic power converters, and in particular to a DC-DC-Converter that can be operated as a resonant converter.

Figure 1:
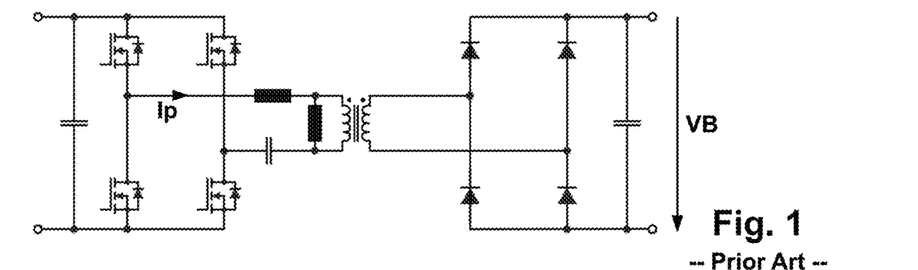
FIG. 1 an LLC converter topology.

On-board chargers (OBCs) for electric vehicles (EVs) are typically two-stage converters. First a power factor compensation (PFC) stage rectifies the AC mains voltage and provides a stable DC-link voltage. Second, a DCDC stage is used to provide galvanic isolation between the DC-link of the PFC stage and the HV battery as well as voltage adaption between the constant DC-link voltage of the PFC stage and the variable battery voltage. Nowadays the LLC topology FIG. 1 is the state of the art for the DCDC stage of OBCs.

The LLC has two main advantages: First, the MOSFETs are always operated under zero-voltage switching conditions, allowing high frequency operation. Second, the primary winding RMS current is low at full power, reducing the conduction losses of the MOSFETs. Both advantages allow keeping the cost for the MOSFETs, which are the most expensive part of the DCDC stage, low.

Figure 2:
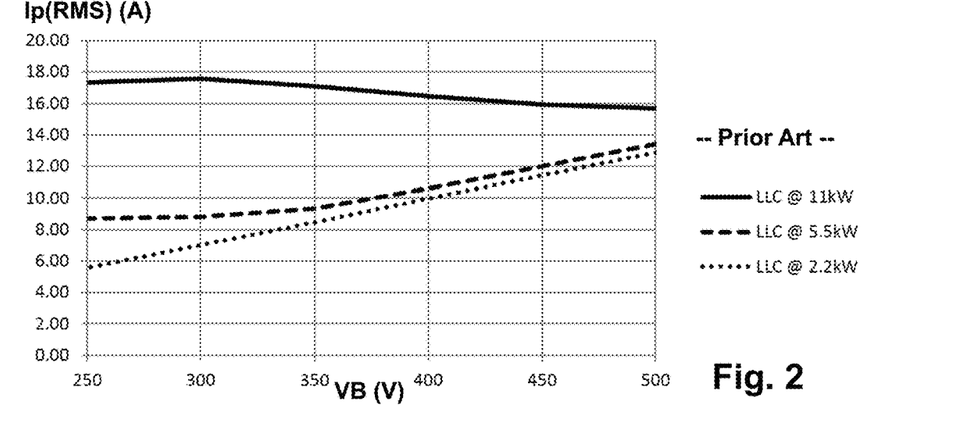
FIG. 2 for this topology, primary winding current Ip(RMS) vs. battery (or output) voltage VB, for different loads.

However, the power flow of an LLC is controlled by varying the switching frequency by a factor of 2-3. The variable frequency imposes additional challenges for the EMI filter design and the transformer of the LLC. Furthermore, at light load the RMS current at the primary winding Ip(RMS), and therefore at the MOSFETs, is relatively high. This is shown in FIG. 2: If the power is reduced from 11 kW to 2.2 kW load at the maximum battery voltage (VB) of 500V, the primary winding current only reduces slightly from 15.7 A to 12.9 A. Therefore, the light-load efficiency of an LLC at high output voltage is relatively poor.

The reason for the high primary winding current of the LLC at high output voltage and light-load is that the LLC requires a certain value of magnetizing current to cover the required battery voltage range. At light load this magnetizing current remains and causes unnecessary conduction losses.

Figure 3:
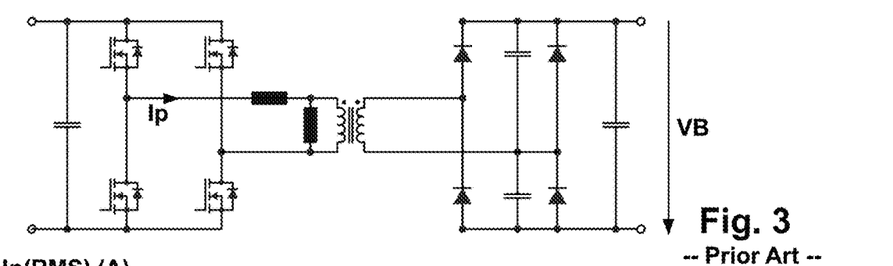
FIG. 3 a zero-voltage switching series resonant converter.

Another topology, which could be used for the DCDC stage of an OBC, is the zero-voltage switching series resonant converter (ZVS SRC) shown in FIG. 3. It operates at constant switching frequency and also provides ZVS to the MOSFETs—but does not require that much magnetizing current.

Figure 4:
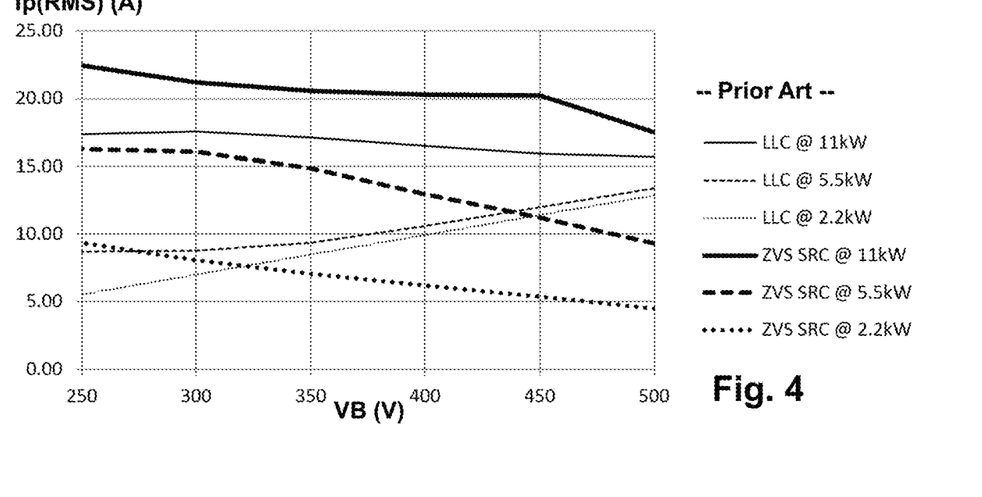
FIG. 4 for this topology, Ip(RMS) vs. VB, for different loads.

However, the primary winding RMS current of the ZVS SRC at full load is generally higher than that of the LLC and increases with lower battery voltage as shown in FIG. 4. The reason for that is that the duty cycle of the ZVS SRC is varied to control the output current. The lower the battery voltage is, the lower the duty cycle and the lower the effective primary winding voltage. Low primary winding voltage demands for high primary winding current to transfer the power, therefore the primary winding current of the ZVS SRC is high at low battery voltage. However, if the power is reduced, also the primary winding current of the ZVS SRC is reduced almost proportionally.

It is therefore an object of the invention to create a DC-DC converter of the type mentioned initially, which overcomes at least some of the disadvantages mentioned above.

SUMMARY OF THE INVENTION

The DC-DC converter is designed for exchanging electrical power between an input side, comprising a positive input terminal and a negative input terminal, and an output side, comprising a positive output terminal and a negative output terminal. The DC-DC converter comprises at least two inductive elements, a first inductive element and a second inductive element, each inductive element comprising
1. a transformer,
2. a first input terminal and a second input terminal arranged to supply a current to a primary winding of the transformer,
3. a first output terminal and a second output terminal arranged to supply a current to a secondary winding of the transformer,
4. and at least one converter inductance arranged in the path of a current flowing through at least one of the terminals of the respective inductive element (that is, at least one of its input terminals and output terminals), a switching circuit arranged to supply
5. a first alternating voltage to the first input terminal and second input terminal of the first inductive element and
6. a second alternating voltage to the first input terminal and the second input terminal of the second inductive element, a rectification circuit arranged between the positive output terminal and the negative output terminal,
7. to rectify a first output voltage arising between the first output terminal and the second output terminal of the first inductive element, and
8. to rectify a second output voltage arising between the first output terminal and the second output terminal of the second inductive element,
9. one of the output terminals of the first inductive element being capacitively coupled to one of the output terminals of the second inductive element.

This capacitive coupling can be implemented by a converter capacitance. This capacitive coupling, in cooperation with one of the converter inductances, constitutes the resonant circuit of a series resonant converter.

The main advantages of this topology over the state-of-the-art, in particular over an LLC topology are:
it can be driven with a constant switching frequency. This in turn reduces EMC filter requirements and simplifies control. RMS currents can be relatively low, in particular proportional to the DC input current. efficiencies for light loads are better, even at wide operating ranges of power and voltage.

In embodiments, the DC-DC converter comprises a control unit configured to control the first alternating voltage and second alternating voltage to have a phase shift relative to one another, the phase shift controlling a power transfer between the input side and the output side.

The control unit can be arranged to generate switching commands to drive switch units of the switching circuit to generate a required voltage trajectory corresponding to a desired alternating voltage.

In embodiments, the control unit is configured to control the first alternating voltage and second alternating voltage to be pulse waves, in particular square waves.

In embodiments, the switching circuit comprises a voltage midpoint, and for each of the inductive elements one associated half bridge arranged between the positive input terminal and the negative input terminal,
and each of the inductive elements has one of its input terminals connected to the voltage midpoint and the other one of its input terminals connected to an associated bridge midpoint of the associated half bridge.

This allows to apply half of the voltage between the positive input terminal and negative input terminal, or its inverse, to the input terminals of each of the inductive elements.

In embodiments, the voltage midpoint is capacitively coupled by an upper input capacitance to the positive input terminal and is capacitively coupled by a lower input capacitance to the negative input terminal.

In embodiments, the switching circuit comprises, for each of the inductive elements two associated half bridges arranged between the positive input terminal and the negative input terminal, and each of the inductive elements has each of its input terminals connected to an associated bridge midpoint of an associated half bridge.

In other words, the switching circuit comprises a full bridge circuit for each of the inductive elements. This allows to apply the full voltage that is supplied at the positive input terminal and negative input terminal, or its inverse, to the input terminals of each of the inductive elements.

In an embodiment, the switching circuit comprises, for each inductive element, an associated push-pull inverter. Therein, each inductive element primary winding comprises an additional center-tap, connected to the positive input terminal. Each input terminal of each inductive element can be connected to the negative input terminal with an associated semiconductor switch.

In embodiments, each of the half bridges comprises an upper switch unit connecting the positive input terminal to a bridge midpoint and a lower switch unit connecting the bridge midpoint to the negative input terminal,
wherein preferably each switch unit comprises a semiconductor switch in parallel with a freewheeling diode.

In embodiments, the rectification circuit comprises, for each of the inductive elements, an associated diode bridge rectifier arranged between the output terminals of the respective inductive element and the positive output terminal and negative output terminal.

In embodiments, the DC-DC converter comprises three or more inductive elements,
the switching circuit being arranged to supply
1. a separate alternating voltage to the first input terminal and second input terminal of each of the inductive elements,
the rectification circuit being arranged
2. to rectify the output voltage arising between the first output terminal and the second output terminal of each of the inductive elements, and
3. for each one of the inductive elements, one of its output terminals being capacitively coupled to one of the output terminals of one of the other inductive elements by means of converter capacitances, in particular by the output terminals of the inductive elements and the converter capacitances forming a series circuit.

In embodiments, the inductive elements form a sequence, the sequence comprising one first inductive element, one or more intermediate inductive elements and one last inductive element. The first and last inductive elements each have one output terminal that is capacitively coupled to an output terminal of one of the intermediate inductive elements. Each intermediate inductive element has its first output terminal capacitively coupled to an output terminal of a preceding inductive element and its second output terminal capacitively coupled to an output terminal of a subsequent inductive element. The preceding and subsequent inductive elements can be the first, the last, or another one of the intermediate inductive elements.

In embodiments, the DC-DC converter comprises four inductive elements, and the control unit is configured to drive a first pair of the inductive elements with alternating voltages both following a first signal waveform and a second pair of the inductive elements with alternating voltages both following a second signal waveform, the two signal waveforms having the same shape but being phase shifted relative to one another.

The alternating voltages driving, for example, the first pair of the inductive elements, can be generated by the same circuit, with the input terminals of these inductive elements being connected in parallel. Alternatively, the alternating voltages can be generated by separate circuits, these separate circuits being controlled to generate the same voltage values.

In embodiments, the first pair of the inductive elements is constituted by the first and second, and the second pair by the third and fourth inductive elements of a sequence of inductive elements. In embodiments thereof, the voltage applied to the first inductive element is the same as the voltage applied to the second inductive element, and the voltage applied to the third inductive element is the same as the voltage applied to the fourth inductive element.

In embodiments, the first pair of the inductive elements is constituted by the first and last, and the second pair by the second and third inductive elements of a sequence of inductive elements. In embodiments thereof, the voltage applied to the first inductive element is the inverse of the voltage applied to the last inductive element, and the voltage applied to the second inductive element is the inverse of the voltage applied to the third inductive element.

In embodiments with more than two inductive elements, the switching circuits can be operated such that the output current is contributed by as many rectification circuits in parallel as possible in order to reduce the primary current RMS value to the lowest possible level.

In embodiments, in at least two half bridges of the rectification circuit, these half bridges being associated with different inductive elements, active switches are present in addition to the diodes, thereby allowing for a power flow from the output side to the input side.

Further embodiments are evident from the dependent patent claims.

DESCRIPTION OF THE DRAWING

The subject matter of the invention will be explained in more detail in the following text with reference to exemplary embodiments which are illustrated in the attached drawings, which schematically show.

In principle, identical parts are provided with the same reference symbols in the figures.

DETAILED DESCRIPTION

Figure 5:
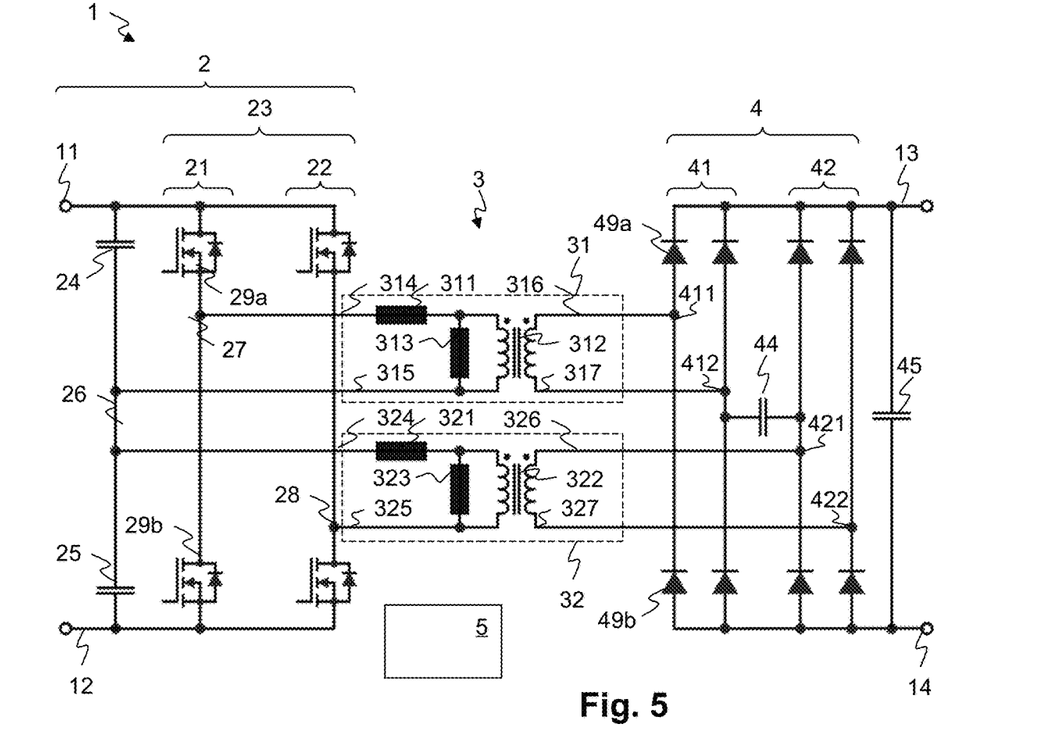
FIG. 5 an improved zero-voltage switching series resonant converter.

FIG. 5 schematically shows a DC-DC converter that can be operated as an improved zero-voltage switching series resonant converter (IZVS SRC). On the primary side, or input side, there is a switching circuit 2 with a positive input terminal 11 and a negative input terminal 12, which can be connected to a DC-link of the PFC of the OBC. The switching circuit 2 comprises a bridge circuit 23 with two half bridges 21, 22 and a capacitive stable midpoint 26 of the DC-link. If the PFC uses a split DC-link, such as the Vienna rectifier does, this midpoint 26 is already available. Two preferably identical transformers 312, 323 are used to provide galvanic isolation and voltage adaption between primary and secondary side. Each transformer primary winding is connected between the voltage midpoint 26 and a corresponding bridge midpoint 27, 28 of one of the half bridges 21, 22. Each half bridge, therefore, can supply a 50% duty cycle square wave to one of the two transformers, as explained in more detail below. Each transformer secondary winding is connected to a corresponding full bridge diode rectifier 41, 42. A resonant capacitor or converter capacitance 44 connects one secondary winding terminal of one transformer with one secondary winding terminal of the other transformer.

Each half bridge is arranged to connect the associated bridge midpoint 27, 28 to either the positive input terminal 11 or the negative input terminal 12, by means of switch units 29, in particular an upper switch unit 29a and lower switch unit 29b. A switch unit 29 can be implemented by a semiconductor switch, for example, a MOSFET, in parallel with a diode.

In at least one of the connections of each transformer 312, 322, a converter inductance 311, 321 is present. This inductance can act as the inductance of the series resonant circuit, cooperating with the converter capacitance 44. A magnetisation inductance 313, 323 is represented by a separate element, in parallel to one of the windings of the respective transformer 312, 322, but in reality is an integral part of that transformer. The combination of each transformer 312, 322 with an associated converter inductance 311, 321 shall be denoted an inductive element 31, 32. Two or more such inductive elements can be present. Preferably, they have the same electrical properties.

Each inductive element has a respective first input terminal 314, 324, second input terminal 315, 325, first output terminal 316, 326 and second output terminal 317, 327. In each inductive element 31, 32, the respective first input terminal 314, 324 and second input terminal 315, 325 can be considered to be part of a primary side of the respective inductive element 31, 32. Likewise, the first output terminal 316, 326 and second output terminal 317, 327 can be considered to be part of a secondary side of the respective inductive element 31, 32.

Figure 6:
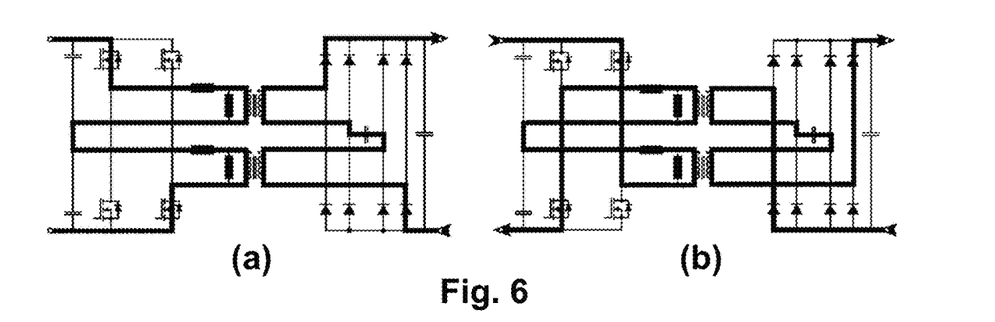
FIG. 6 current paths for a 180° phase shift of primary side voltages.
Figure 7:
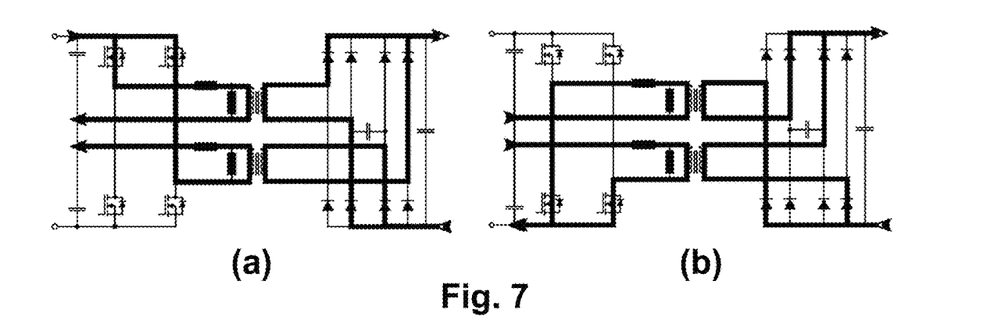
FIG. 7 current paths for a 0° phase shift of primary side voltages.

Depending on the phase shift between the two primary MOSFET half bridges, the two transformer secondary windings can either act in series (FIG. 6) or parallel (FIG. 7). FIG. 6 shows current paths, by bold lines, during a positive (a) and a negative (b) half-period with 180° phase shift between the two primary half bridges. FIG. 7 shows current paths during a positive (a) and a negative (b) half-period with 0° phase shift between the two primary half bridges. Between these two extreme cases of 180° and 0° the phase shift can be continuously adjusted to control the power flow to the secondary side. The option to provide power to the battery with the secondary windings connected either in series or in parallel allows to keep the RMS current at the primary side switches and the transformer windings always at a minimum.

The parameters of the converter 1 can be chosen such that the converter always operates in buck mode, and full power is achievable throughout the desired operating range. The resonant frequency can be chosen to be slightly higher than the switching frequency, which results in zero-current-switching at certain operating points, in particular at the highest output voltage. Alternatively, it is possible to design the resonant frequency lower than the switching frequency. The switching frequency can be, for example, between 10 kHz and 1 MHz, in particular between 30 kHz and 300 kHz (for example, for an OBC), and even more particular around 130 kHz.

Figure 8:
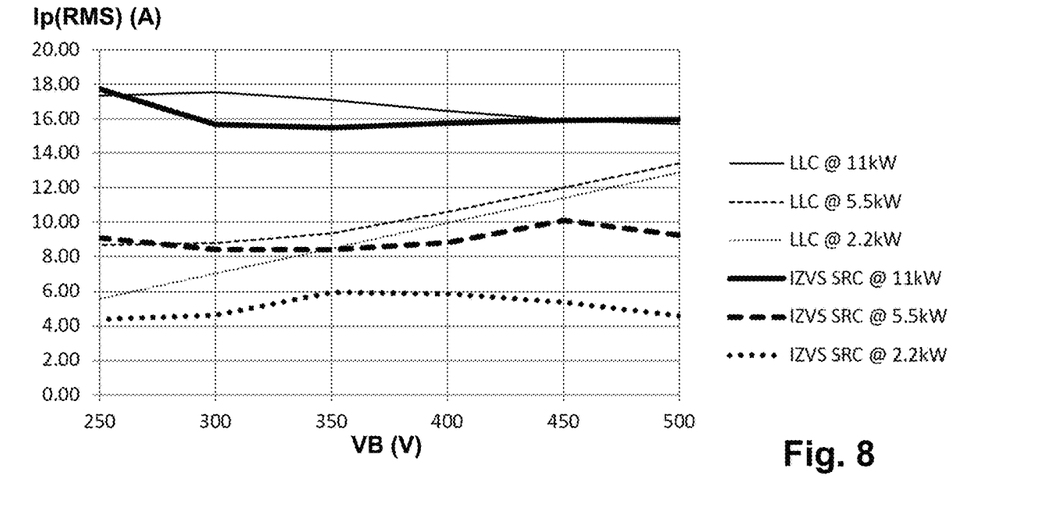
FIG. 8 for the improved topology, Ip(RMS) vs. VB, for different loads.

In FIG. 8, the primary winding RMS current of the IZVS SRC is compared to the one of the LLC. It is shown that the primary winding RMS current of the IZVS SRC is always smaller, or only negligibly higher, than the one of the LLC. In particular at light load (2.2 kW) and high battery voltage (500V) a significant (factor 2.8) reduction of the primary winding RMS current is achieved.

Note: The IZVS SRC actually has two primary windings and their RMS current values are not always equal. In order to allow a fair comparison with the LLC, which only has one primary winding current, the loss-equivalent average of the two IZVS SRC primary winding RMS currents $I_p$ is used for this comparison. It is calculated as $$I_p = \sqrt{\frac{I_{p1}^2 + I_{p2}^2}{2}}$$

from the two actual primary winding RMS currents $I_{p1}$ and $I_{p2}$ of the IZVS SRC.

Figure 9:
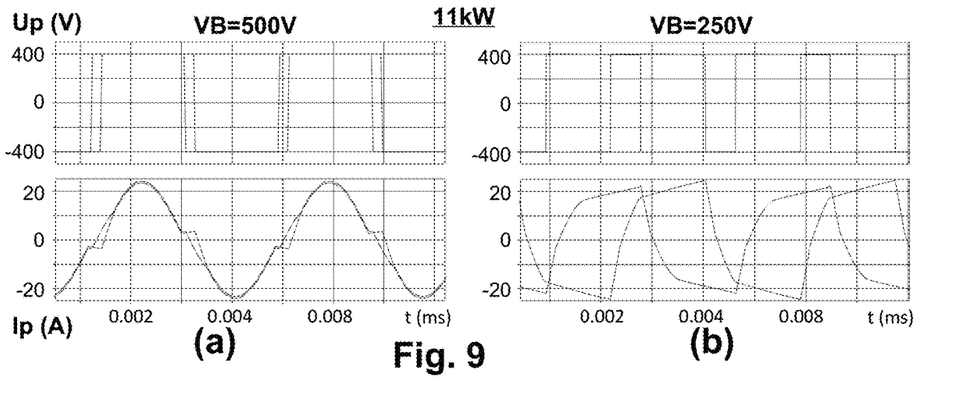
FIG. 9 Voltages and currents at the primary windings at 11 kW with 500V (a) and 250 V (b) battery voltage.
Figure 10:
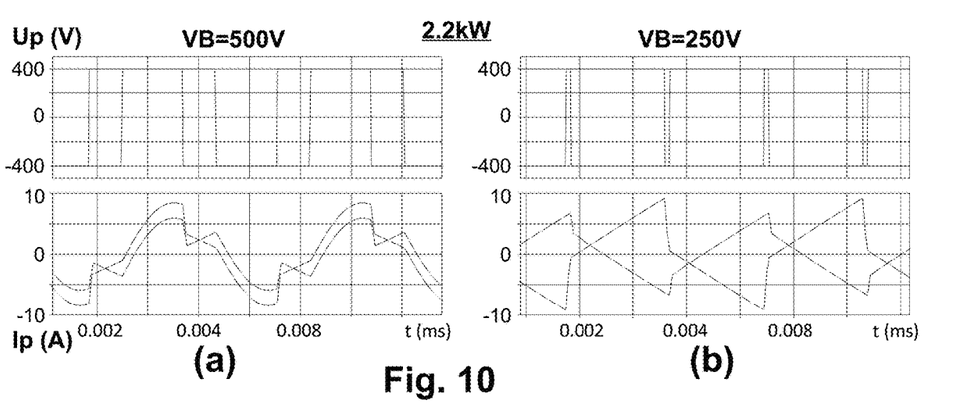
FIG. 10 the same, at 2.2 kW with 500V (a) and 250 V (b) battery voltage.

For the extreme cases of low (250V) and high (500V) battery voltage at high (11 kW) and low (2.2 kW) charging power, the voltages and current waveforms at the primary windings are shown in FIG. 9 and FIG. 10. Each pair of graphs shows the primary voltages Up and primary currents Ip. The first primary voltage and current (at the first inductive element 31) are drawn with solid lines, the second primary voltage and current in dashed lines. It can be observed that ZVS is obtained for all these cases, which allows to minimize the switching losses and enables a high constant switching frequency.

Figure 11:
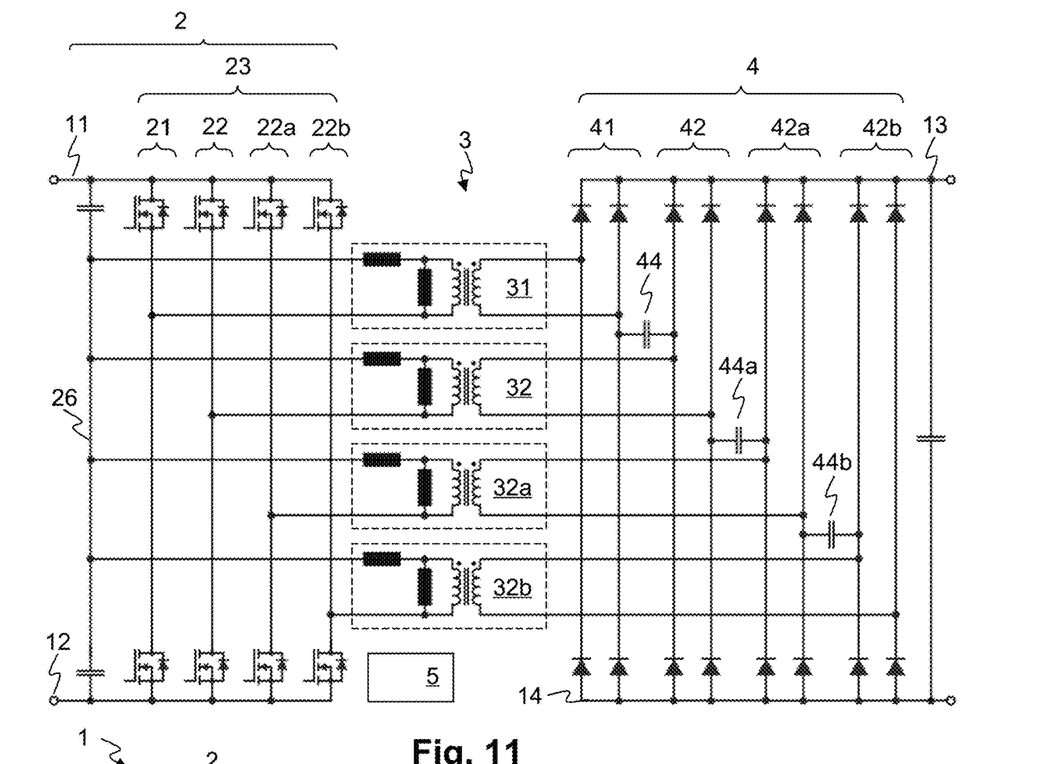
FIG. 11 a variant of the improved converter.

The IZVS SRC achieves low primary winding RMS current for output voltages as low as ½ of the maximum output voltage. This is usually good enough for OBCs for EVs. However, if full-power operation with output voltages as low as ¼ of the maximum output voltage is required, the circuit can be extended as shown in FIG. 11 by using twice the number of MOSFETs, transformers and diodes. To extend the full-power output voltage range down to battery voltages as low as ⅛ of the maximum battery voltage this principle can be continued using four times the number of MOSFETs, transformers and diodes as in the original circuit of the IZVS SRC.

FIG. 11 shows, in addition to the elements already presented, further inductive elements 32a, 32b, each connected, at the primary side, to the voltage midpoint 26 and a corresponding further half bridge 22a, 22b, and at the secondary side, to a corresponding further rectifier 42a, 42b. The rectifiers are connected, at their AC terminals or bridge midpoints, corresponding to the output terminals of the inductive elements, by further converter capacitances 44a, 44b. Each inductive element, except for the first and the last one in a sequence, is capacitively coupled
to a preceding inductive element by a converter capacitance connected to the inductive element's first output terminal, and
to a subsequent inductive element by a converter capacitance connected to the inductive element's second output terminal.

Figure 12:
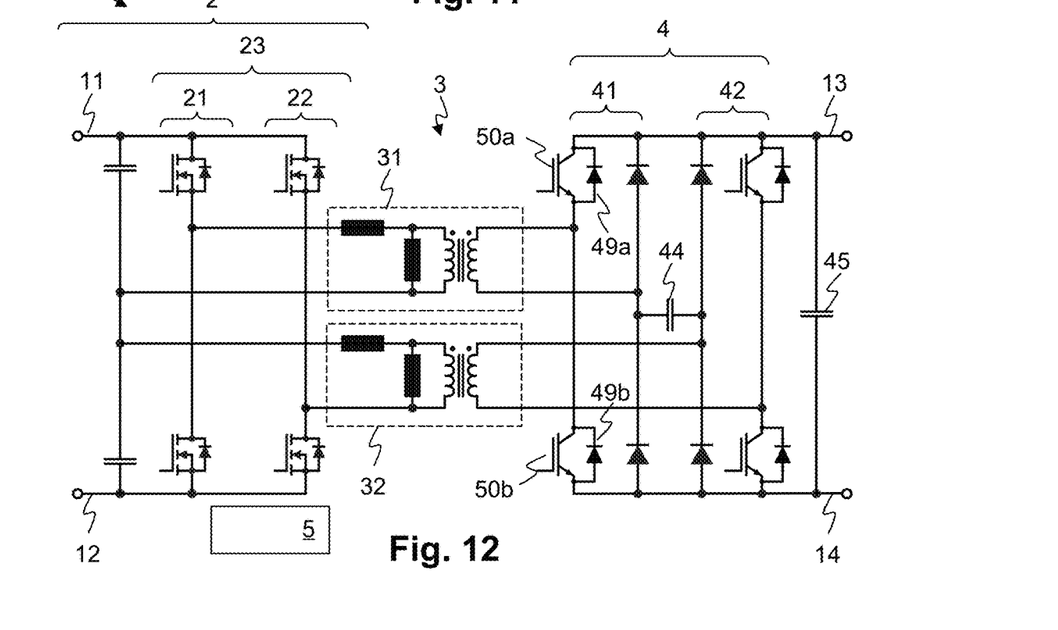
FIG. 12 a converter for bidirectional power flow.

FIG. 12 shows an embodiment allowing for a bidirectional flow of power, that is, also for a power flow from the secondary side to the primary side. For this, the outer branches of the rectification circuit 4, in other words, the half bridges of the first rectifier 41 and second rectifier 42 that are not connected to the converter capacitance 44, comprise upper switches 50a and lower switches 50b in parallel to the respective upper and lower diodes 49a, 49b. For topologies with more than two inductive elements, as in FIG. 11, likewise the outer two branches, not connected to any of the converter capacitances 44, 44a, 44b, can comprise the additional switches 50a, 50b.

Figure 13:
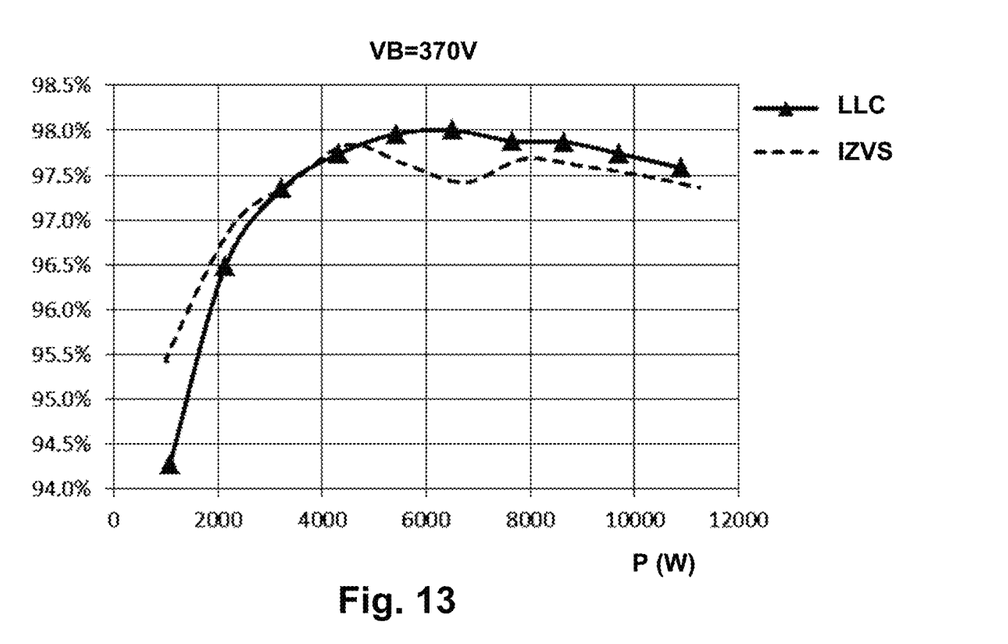
FIGS. 13-14 comparison of converter efficiency with a prior art LLC converter.
Figure 14:
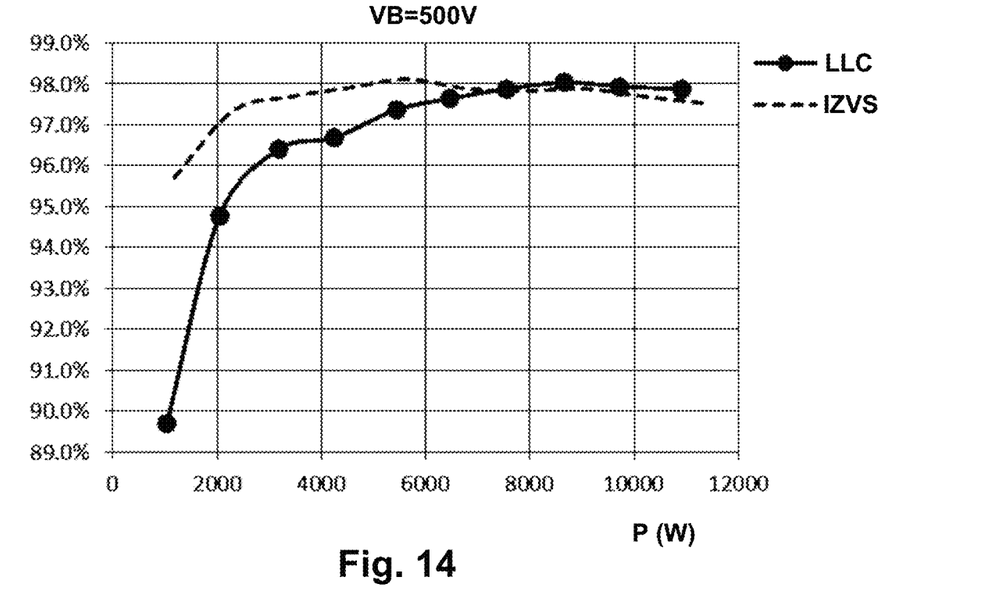

FIGS. 13 and 14 show a comparison of power conversion efficiencies at different power levels, measured in a IZVS SRC converter and, as a reference, in an LLC converter with comparable components and parameters. In FIG. 13, the battery voltage is 370 V, and it is evident that at low power transfer rates, the efficiency of the IZVS SRC converter is better. In FIG. 14, the battery voltage is 500 V, and at low power transfer rates the efficiency of the IZVS SRC converter is markedly better.

While the invention has been described in present embodiments, it is distinctly understood that the invention is not limited thereto, but may be otherwise variously embodied and practised within the scope of the claims.

The invention claimed is:

1. A DC-DC converter,
for exchanging electrical power between an input side, comprising a positive input terminal and a negative input terminal, and an output side, comprising a positive output terminal and a negative output terminal,
the DC-DC converter comprising
at least two inductive elements, comprising a first inductive element and a second inductive element, the first inductive element comprising
a first transformer, comprising a first primary winding and a first secondary winding,
a first input terminal and a second input terminal arranged to supply a first primary current to a the first primary winding,
a first output terminal and a second output terminal arranged to supply a first secondary current to -a the first secondary winding,
and at least one first converter inductance arranged in a path of a first current flowing through at least one of the first input terminal, the second input terminal, the first output terminal and the second output terminal,
the second inductive element comprising
a second transformer, comprising a second primary winding and a second secondary winding,
a third input terminal and a fourth input terminal arranged to supply a second primary current to the second primary winding,
a third output terminal and a fourth output terminal arranged to supply a second secondary current to the second secondary winding,
and at least one second converter inductance arranged in a path of a second further current flowing through at least one of the third input terminal, the fourth input terminal, the third output terminal and the fourth output terminal,
a switching circuit arranged to supply
a first alternating voltage to the first input terminal and second input terminal and
a second alternating voltage to the third input terminal and the fourth input terminal,
a rectification circuit arranged between the positive output terminal and the negative output terminal,
to rectify a first output voltage arising between the first output terminal and the second output terminal, and
to rectify a second output voltage arising between the third output terminal and the fourth output terminal,
one of the first and second output terminals being capacitively coupled to one of the third and fourth output terminals,
the DC-DC converter comprising a control unit configured to control the first alternating voltage and second alternating voltage to have a phase shift relative to one another, and to continuously adjust the phase shift between the first alternating voltage and the second alternating voltage to control a power transfer between the input side and the output side.

2. The DC-DC converter of claim 1, wherein the control unit is configured to control the first alternating voltage and second alternating voltage to be pulse waves.

3. The DC-DC converter of claim 1, wherein the switching circuit comprises a voltage midpoint, and for each of the inductive elements one associated half bridge arranged between the positive input terminal and the negative input terminal,
and each of the inductive elements has one of its input terminals connected to the voltage midpoint and another one of its input terminals connected to an associated bridge midpoint of the associated half bridge.

4. The DC-DC converter of claim 3, wherein the voltage midpoint is capacitively coupled by an upper input capacitance to the positive input terminal and is capacitively coupled by a lower input capacitance to the negative input terminal.

5. The DC-DC converter of claim 1, wherein the switching circuit comprises, for each of the inductive elements two associated half bridges arranged between the positive input terminal and the negative input terminal,
and each of the inductive elements has each of its input terminals connected to an associated bridge midpoint of an associated half bridge.

6. The DC-DC converter of claim 3, wherein each of the half bridges comprises an upper switch unit connecting the positive input terminal to a bridge midpoint and a lower switch unit connecting the bridge midpoint to the negative input terminal.

7. The DC-DC converter of claim 1, wherein the rectification circuit comprises, for each of the inductive elements, an associated diode bridge rectifier arranged between the output terminals of the respective inductive element and the positive output terminal and negative output terminal.

8. The DC-DC converter of claim 1, comprising three or more inductive elements,
the switching circuit being arranged to supply
a separate alternating voltage to the first input terminal and second input terminal of each of the inductive elements,
the rectification circuit being arranged
to rectify the output voltage arising between the first output terminal and the second output terminal of each of the inductive elements, and
for each one of the inductive elements, one of its output terminals being capacitively coupled to one of the output terminals of another one of the inductive elements by means of converter capacitances, in particular by the output terminals of the inductive elements and the converter capacitances forming a series circuit.

9. The DC-DC converter of claim 8, further comprising four inductive elements, wherein the control unit is configured to drive a first pair of the inductive elements with alternating voltages both following a first signal waveform and a second pair of the inductive elements with alternating voltages both following a second signal waveform, the first signal waveform and the second signal waveform having the same shape but being phase shifted relative to one another;
further comprising a control unit configured to control the first alternating voltage and second alternating voltage to have a phase shift relative to one another, the phase shift controlling a power transfer between the input side and the output side.

10. The DC-DC converter of claim 9, wherein the first pair of the inductive elements is constituted by a first and second inductive elements of a sequence of inductive elements, and the second pair by a third and fourth inductive elements of the sequence of inductive elements.

11. The DC-DC converter of claim 9, wherein the first pair of the inductive elements is constituted by the first and last, and the second pair by the second and third inductive elements of a sequence of inductive elements.

12. The DC-DC converter of claim 1, wherein in at least two half bridges of the rectification circuit, these at least two half bridges being associated with different inductive elements, active switches are present in addition to diodes, thereby allowing for a power flow from the output side to the input side;
and wherein the rectification circuit comprises, for each of the inductive elements, an associated diode bridge rectifier arranged between the output terminals of the respective inductive element and the positive output terminal and negative output terminal.

13. The DC-DC converter of claim 2, wherein the pulse waves are square waves.

14. The DC-DC converter of claim 6, wherein each switch unit comprises a semiconductor switch in parallel with a freewheeling diode.

15. The DC-DC converter of claim 10, wherein a voltage applied to the first inductive element is the same as a voltage applied to the second inductive element, and a voltage applied to the third inductive element is the same as a voltage applied to the fourth inductive element.

16. The DC-DC converter of claim 11, wherein a voltage applied to the first inductive element is the inverse of a voltage applied to the last inductive element, and a voltage applied to the second inductive element is the inverse of a voltage applied to the third inductive element.

17. The DC-DC converter of claim 1, wherein for a first value of the phase shift between the first alternating voltage and the second alternating voltage the first secondary winding and the second secondary winding act as in a series arrangement, and wherein for a second value of the phase shift they act as in a parallel arrangement.

* * * * *